United States Patent
Ikeuchi et al.

(10) Patent No.: US 7,370,145 B2
(45) Date of Patent: May 6, 2008

(54) WRITE BACK METHOD FOR RAID APPARATUS

(75) Inventors: Kazuhiko Ikeuchi, Kawasaki (JP); Mikio Ito, Kawasaki (JP); Hidejiro Daikokuya, Kawasaki (JP); Shinya Mochizuki, Kawasaki (JP); Hideo Takahashi, Kawasaki (JP); Yoshihito Konta, Kawasaki (JP); Yasutake Satou, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 11/356,287

(22) Filed: Feb. 17, 2006

(65) Prior Publication Data

US 2007/0067667 A1    Mar. 22, 2007

(30) Foreign Application Priority Data

Sep. 22, 2005    (JP)    ............................. 2005-274830

(51) Int. Cl.
    *G06F 12/00*    (2006.01)

(52) U.S. Cl. ........................ 711/113; 711/114; 711/143

(58) Field of Classification Search ................ 711/113, 711/114, 143
    See application file for complete search history.

(56) References Cited

U.S. PATENT DOCUMENTS

| 2003/0182502 | A1 | 9/2003 | Kleiman et al. | |
| 2004/0093463 | A1* | 5/2004 | Shang | 711/113 |
| 2006/0206752 | A1* | 9/2006 | Ikeuchi et al. | 714/6 |

* cited by examiner

*Primary Examiner*—Hiep T. Nguyen
(74) *Attorney, Agent, or Firm*—Staas & Halsey LLP

(57) ABSTRACT

A RAID control apparatus comprises at least a cache memory; an update information management table for storing update information; an update information storage unit for storing, in the update information management table, update information by detecting a data update; a reference value generation unit for generating a reference value expressing a load of a write back processing by using a Small Write method and a Read & Bandwidth Write method based on the update information; a write method determination unit for determining a write method according to the reference value and a write unit for carrying out a write processing, in order to provide a write back method for a RAID apparatus capable of improving a processing speed at the time of updating even in the case of including the processing of updating a part of data stripes.

15 Claims, 11 Drawing Sheets

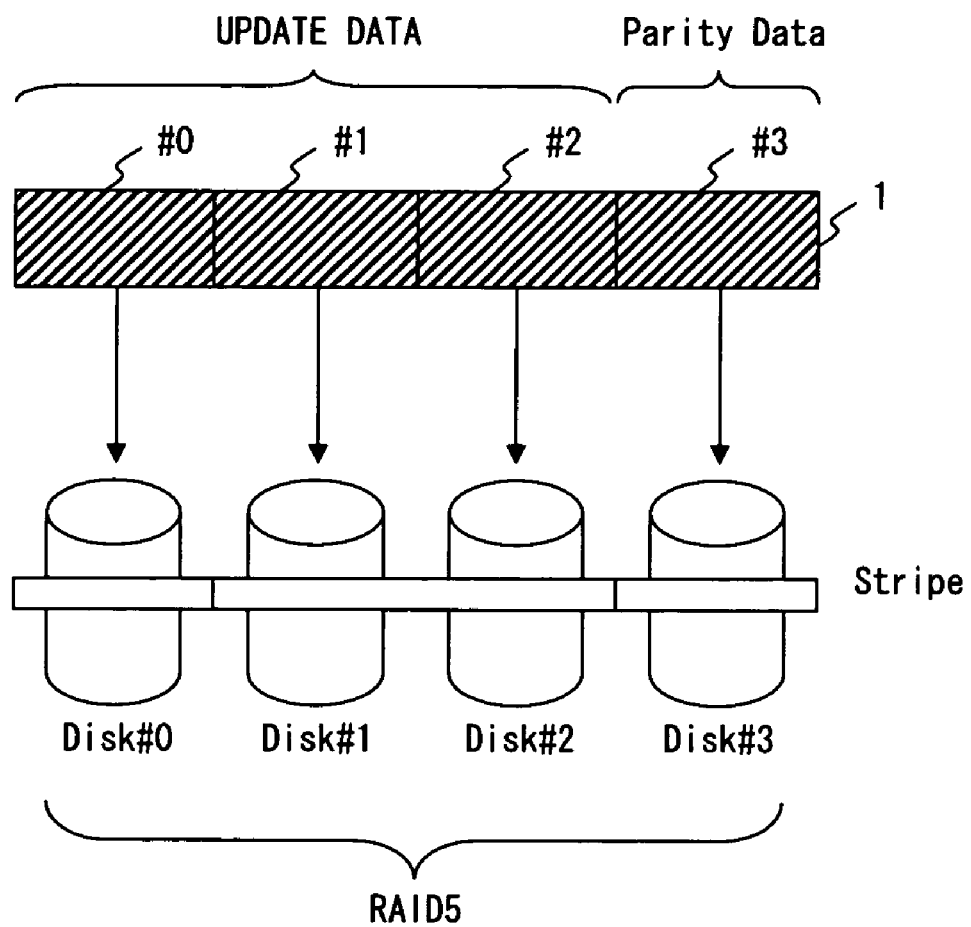
F I G. 1

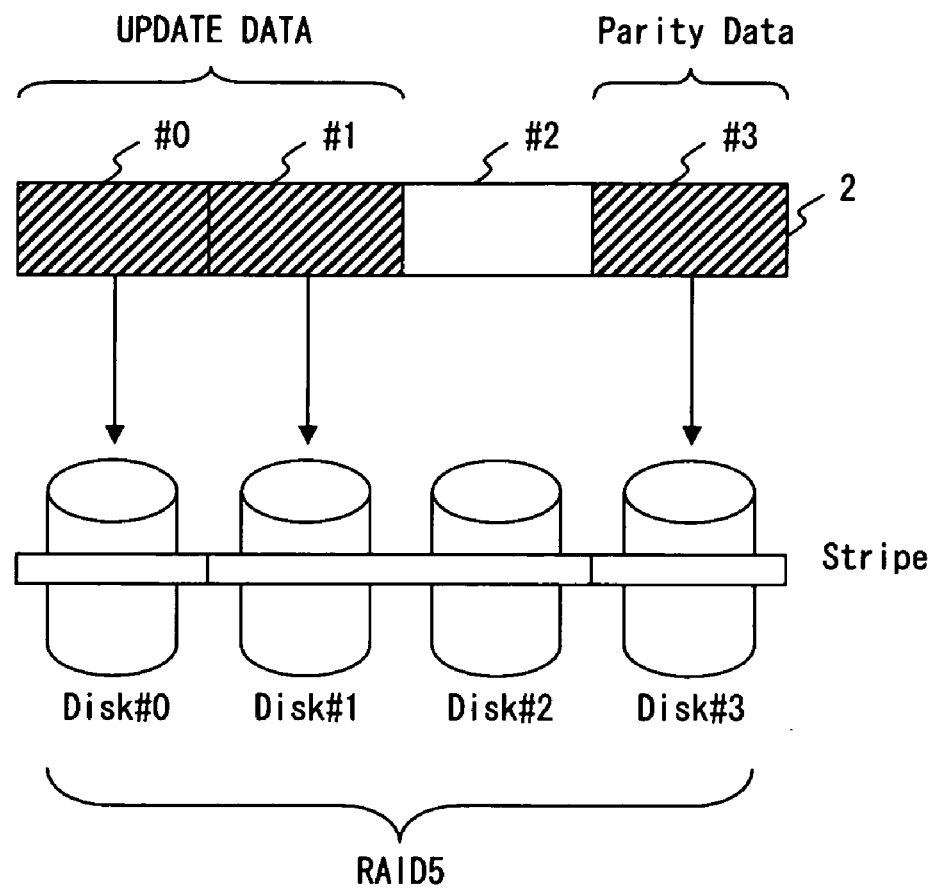
F I G. 2

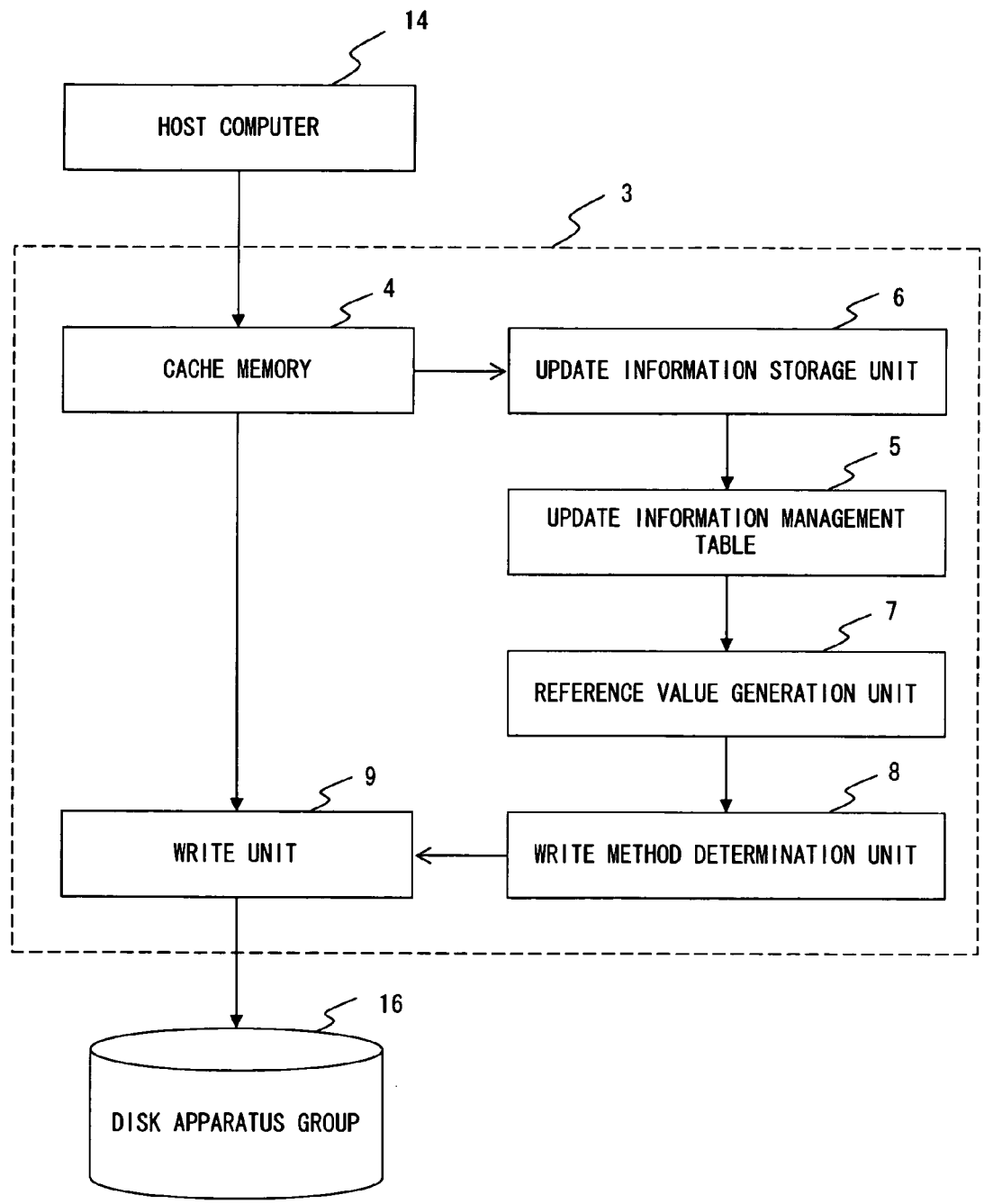
F I G. 3

FIG. 6

| UPDATE DATA NUMBER | 0 | | | | | | 1 | | | | | | 2 | | | | | |
|---|---|---|---|---|---|---|---|---|---|---|---|---|---|---|---|---|---|---|
| DATA STRIPE NUMBER | 0 | | | | | | 1 | | | | | | 2 | | | | | |
| BLOCK NUMBER | 0 | 1 | 2 | ... | 126 | 127 | 0 | 1 | 2 | ... | 126 | 127 | 0 | 1 | 2 | ... | 126 | 127 |
| BLOCK UPDATE FLAG | 1 | 1 | 1 | ... | 1 | 0 | 1 | 1 | 1 | ... | 1 | 1 | 1 | 1 | 1 | ... | 1 | 1 |

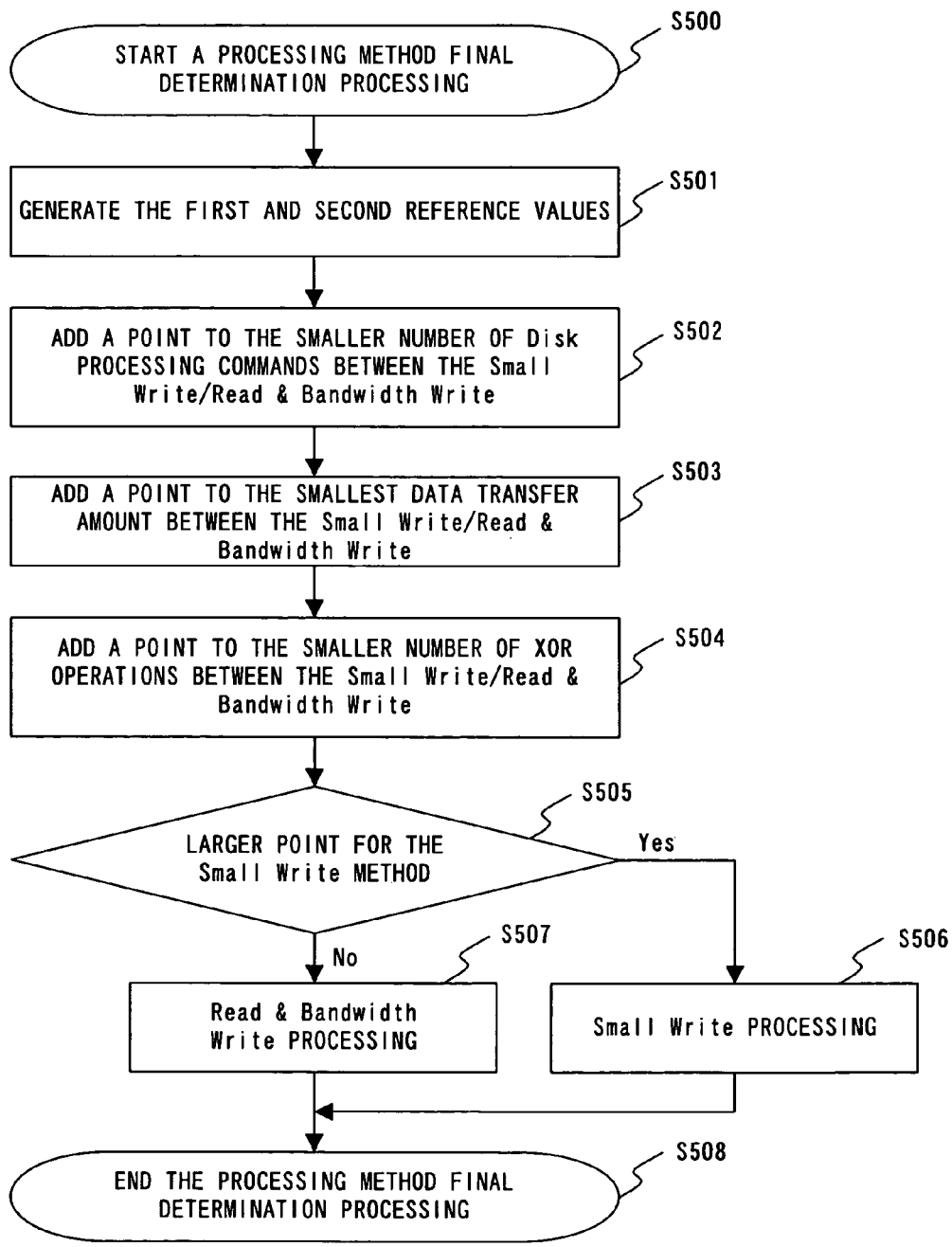
F I G. 7

WRITE BACK METHOD FOR RAID APPARATUS

BACKGROUND OF THE INVENTION

1. Field of the Invention

The present invention relates to a write back method for a RAID control system in a disk array subsystem.

2. Description of the Related Art

RAID (redundant array of independent/inexpensive disk drives) apparatuses are widely used as means for storing a very large amount of data handled by a computer system. A RAID 5 especially, is widely utilized for reasons such as a high cost performance ratio, a simple configuration accomplishing protection of data, et cetera.

Since the RAID 5 maintains a redundancy of data by using a parity disk, the data (i.e., parity data) therein needs to be updated when performing a write back processing.

Here, the write back processing means the processing of writing, to the disk, information no longer needed by a cache memory when writing new information into a cache memory within a RAID control apparatus of a disk.

FIG. 1 exemplifies data within a cache memory comprised by a RAID control apparatus in the case of updating all data stripes at the time of a write back processing.

An update data sent from a host computer, et cetera, to the RAID control apparatus is subjected to a striping (simply "striped" hereinafter) thereby. And, if data as the target of updating exists in a cache memory, the aforementioned data will be updated by the update data.

Here, one piece of data striped by a RAID control apparatus is called a "data stripe" in the following description.

The data 1 shown by FIG. 1 indicates the data of a RAID 5 comprising four disks (i.e., disks #0 through #3 shown by FIG. 1), with the data being striped across #0 through #3.

And the data 1 shown by FIG. 1 indicates the case of all the data stripes #0 through #2 being update data.

Since all the updating data stripes (i.e., data stripes #0 through #2) are in the cache memory, parity data (i.e., a data stripe #3) can be generated without performing a processing of reading from the disks #0 through #3. Then the generated data 1 is stored in the disks #0 through #3 (NB: the writing method is called a "Bandwidth Write method").

FIG. 2 exemplifies data within a cache memory comprised by a RAID control apparatus in the case of updating a part of data stripes at the time of a write back processing.

Data 2 shown by FIG. 2, likewise FIG. 1, shows data of RAID 5 comprising four disks (i.e., disks #0 through #3 shown by FIG. 2), with the data being striped in #0 through #3.

And the data 2 shown by FIG. 2 indicates the case of only the data stripes #0 and #1 being update data.

In this case, since a part of data of the stripes is in the cache memory, it is necessary to generate parity data by reading pre-update data from the disks #0, #1 and #3 and obtaining an exclusive logical sum (simply called "XOR" hereinafter) with the update data (i.e., the data stripes #0 and #1), followed by storing the update data and the generated parity data in the disks #0, #1 and #3, respectively (this storing (i.e., writing) method is called a "Small Write method").

As described above, at the time of a data update processing under the RAID 5, in particular updating a part of the update data (i.e., a write processing to a disk), it is necessary to read once the pre-update data and parity data from the disks and generate new parity data (called "update parity" hereinafter) corresponding to the update data, followed by writing the update parity as well as the update data to the disk.

That is, updating a part of data stripes has faced the problem of needing an extra process, such as reading a pre-update data from the disk, et cetera, as compared to the case of updating all the data stripes, thus resulting in slowing down the processing speed at the time of updating.

In the meantime, a laid-open Japanese patent application publication No. 07-311659 has disclosed a disk array apparatus for managing update data after a write processing by a host computer by storing the update data in a cache memory, and also managing a pre-updated data by using a cache management table if the pre-updated data is left in the cache memory in order to shorten the time required for a write back processing, thereby improving a throughput.

SUMMARY OF THE INVENTION

In consideration of the above described problem, the challenge of the present invention is to provide a write back method for a RAID apparatus capable of improving a processing speed at the time of an update if it includes the processing of updating a part of the data stripes.

In order to solve the above described problem, a write back method for a RAID control apparatus according to the present invention makes a RAID apparatus carry out: an update information storing processing for storing update information of post-update data stored by a cache memory, which has been updated by update data sent from a host computer, in an update information management table; a reference value generation processing, by obtaining the update information of the post-update data from the update information management table, for generating a first reference value expressing a load of a write processing by using a Small Write method, based on the aforementioned update information, and a second reference value expressing a load of a write processing by using a Read & Bandwidth Write method; a write method determination processing, by comparing the first reference value with the second reference value generated by the aforementioned reference value generation processes, for determining a write method of either the Small Write method or the Read & Bandwidth Write method, based on the comparison result; and a write processing for writing the data stripe of the post-updated at a which is stored by the cache memory, and updating the data stripe by using a method determined by the write method determination processing.

The present invention generates the first and second reference values by the reference value generation processing, and determines a write method based on a result of comparing the first and second reference values by the write method determination processing. Then a write processing is carried out by the determined write method, and therefore the benefit is that it is possible to make a RAID control apparatus carry out a write back processing with a reduced load, based on the comparison result.

The present invention also provides the same benefit by a RAID control apparatus comprising: an update information storage unit for storing update information of post-update data stored by a cache memory, which has been updated by update data sent from a host computer, in an update information management table; a reference value generation unit, by obtaining the update information of the post-update data from the update information management table, for generating a first reference value expressing a load of a write processing by using a Small Write method, based on the aforementioned update information, and a second reference value expressing a load of a write processing by using a Read & Bandwidth Write method; a write method determination unit, by comparing the first reference value with the second reference value generated by the reference value generation unit, for determining a write method out of either the Small Write method or the Read & Bandwidth Write method, based on the comparison result; and a write unit for reading the data stripe of the post-update data which is stored by the cache memory, and updating the data stripe by using a method determined by the write method determination unit.

Meanwhile, the present invention also provides the same benefit as a RAID apparatus equipped with a plurality of storage units for storing update data sent from a host computer, comprising: an update information storage unit for storing update information of post-update data stored by a cache memory, which has been updated by update data, in an update information management table; a reference value generation unit, by obtaining the update information of the post-update data from the update information management table, for generating a first reference value expressing a load of a write processing by using a Small Write method, based on the aforementioned update information, and a second reference value expressing a load of a write processing by using a Read & Bandwidth Write method; a write method determination unit, by comparing the first reference value with the second reference value generated by the reference value generation unit, for determining a write method of either the Small Write method or the Read & Bandwidth Write method, based on the comparison result; and a write unit for reading the data stripe of the post-update data which is stored by the cache memory, and updating the data stripe by using a method determined by the write method determination unit.

As described above, the present invention makes it possible to provide a write back method for a RAID apparatus capable of improving a processing speed at the time of updating even in the case of including the processing of updating a part of data stripes.

BRIEF DESCRIPTION OF THE DRAWINGS

FIG. 1 shows a conventional example of data within a cache memory comprised by a RAID control apparatus in the case of updating all data stripes at the time of a write back processing;

FIG. 2 shows a conventional example of data within a cache memory comprised by a RAID control apparatus in the case of updating a part of data stripes at the time of a write back processing;

FIG. 3 shows the principle of the present invention;

FIG. 6 exemplifies an update information management table generated by an update information storage unit according to the present embodiment;

FIG. 7 is a flow chart showing a processing method final determination processing according to the present embodiment;

DESCRIPTION OF THE PREFERRED EMBODIMENTS

Figure 4:
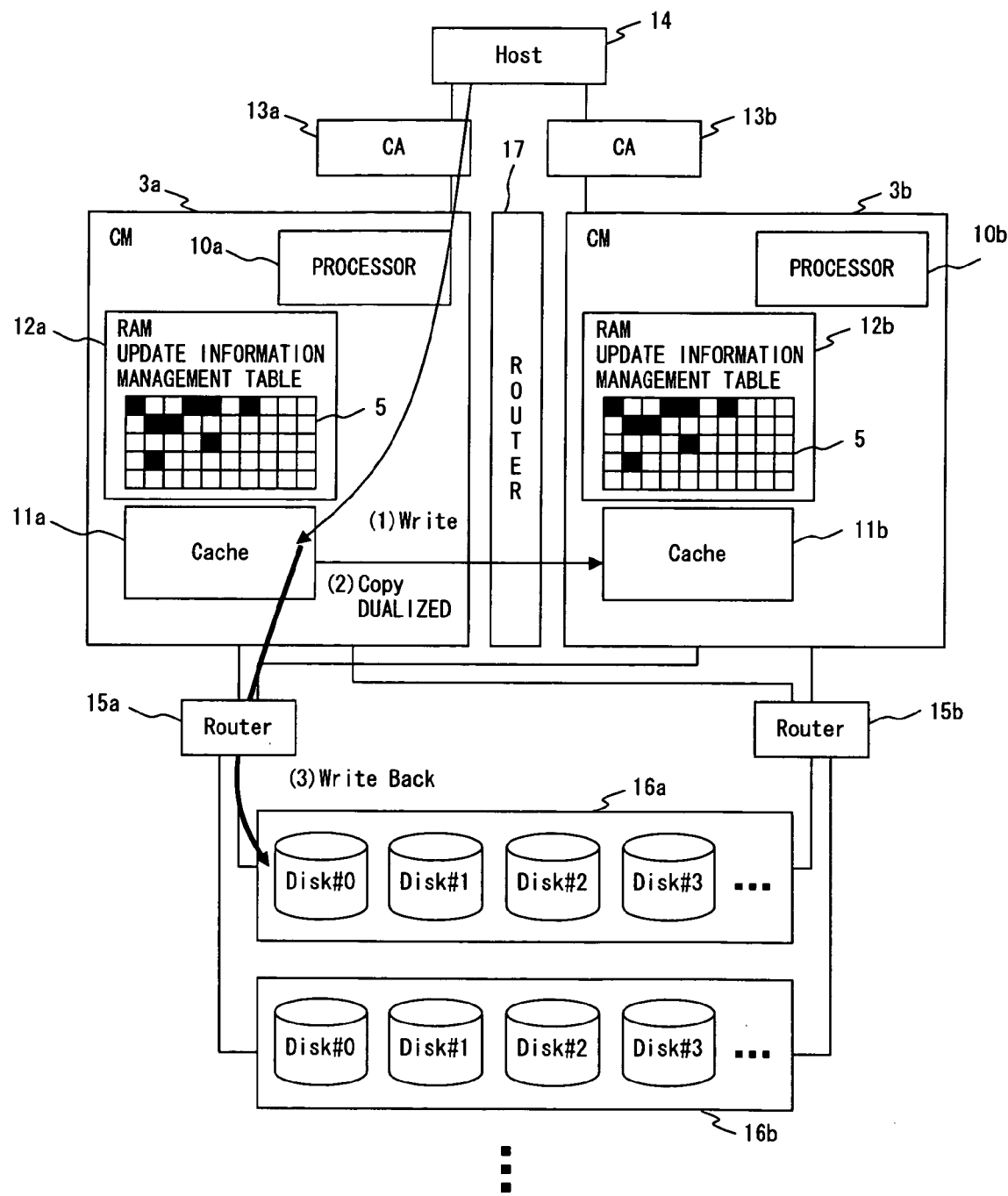
FIG. 4 exemplifies a comprisal of a RAID apparatus according to the present embodiment.

The following is a detailed description of the preferred embodiment of the present invention referring to FIGS. 3 through 11.

FIG. 3 shows the principle of the present invention.

A RAID control apparatus 3 shown by FIG. 3 at least comprises a cache memory 4 storing data temporarily, an update information management table 5 for storing update information (i.e., update part and update position) about data stored by the cache memory 4, an update information storage unit 6 for detecting an update of data stored by the cache memory 4 and storing the update information in the update information management table 5, a reference value generation unit 7 for obtaining update information from the update information management table 5 and generating a reference value expressing a load of a write back processing by using a Small Write method and a Read & Bandwidth Write method from the update information, a write method determination unit 8 for determining a write method (i.e., a Small Write method or a Read & Bandwidth Write method) based on the reference value, and a write unit 9 for carrying out a write back processing by the determined method to a disk apparatus group (i.e., a disk array) 16 connected to the RAID control apparatus 3.

Here, the Read & Bandwidth Write method is, for the update data shown by FIG. 2 for example, the method for reading data from the disk #2, generating an update parity by an XOR operation with update data and storing the update data and the update parity in the disks #0, #1 and #3, respectively.

And the present embodiment refers to data, which is resident in a disk apparatus group 16 or a cache memory 4, prior to being updated by update data sent over from an upper level apparatus such as a host computer 14 as "pre-update data", and to parity data in this event as "pre-update parity". It also refers to data in the cache memory 4, which is updated by update data sent over from an upper level apparatus such as a host computer 14 as "post-update data".

The cache memory 4 is a storage unit for storing temporarily data read out of a disk apparatus group according to a request from the host computer 14, etcetera. And the update information management table 5 is a storage unit for storing update information of data stored by the cache memory 4, e.g., information relating to a presence or absence of an update in the unit of blocks.

The update information storage unit 6 generates update information by detecting an update place (i.e., an update position) where the data in the cache memory 4 is updated and stores it in the update information management table 5.

The reference value generation unit 7 obtains update information of post-update data from the update information management table 5, and generates a first reference value expressing a load in the case of carrying out a write back processing by using the Small Write method and a second reference value expressing a load in the case of carrying out a write back processing by using the Read & Bandwidth Write method, both from the obtained update information.

The present embodiment uses:

(1) the number of commands issued to the disk apparatus group 16;

(2) a data transfer volume between the RAID control apparatus 3 and the disk apparatus group 16; and (3) the number of XOR processing for generating an update parity; as the first and second reference values at the time of a write back processing.

Note that the description herein does not limit the first and second reference values to employing all of the above described (1) through (3). For example, a combination of any one or two of the (1) through (3) may be employed for the first and second reference values.

The write method determination unit 8 compares the first reference value with the second reference value to determine the write method requiring a smaller load. For example, if the first reference value is smaller, the Small Write method is determined, while if the second reference value is smaller, the Read & Bandwidth Write method is determined, as a result of the comparison.

The write unit 9 carries out a write back processing by a write method determined, by the write method determination unit 8, according to a write back processing instruction issued by a cache memory control unit (not shown herein) comprised by the RAID control apparatus 3.

FIG. 4 exemplifies a comprisal of a RAID apparatus according to the present embodiment.

The RAID apparatus shown by FIG. 4 at least comprises a RAID control apparatus CM 3a, whichis connected to a host computer 14 by way of a CA (channel adaptor) 13a, and a disk apparatus group 16a which is connected to the CM 3a by way of a router 15a.

And the present embodiment further comprises a RAID control apparatus CM 3b which is connected to a host computer 14 by way of a CA (channel adapter) 13b, the disk apparatus group 16b, which is connected to the CM 3b by way of a router 15b, and the CM 3a and CM 3b are connected by way of a router 17. And the disk apparatus groups 16a and 16b are connected to the CM 3a and CM 3b by way of the routers 15a and 15b.

Here, the present embodiment exemplifies a configuration in the case of dualizing the RAID control apparatuses (i.e., the CM 3a and CM 3b; simply abbreviated as such hereinafter) and disk apparatus groups (i.e., the disk apparatus groups 16a and 16b), but there is no intention of limiting the invention as such. The configuration may be a redundant configuration employing a dualization or a higher degree of redundancy, or a single unit configuration employing only the CM 3a and disk apparatus group 16a.

The CA 13a is an interface between an I/O (Input & Output) apparatus (not shown herein) comprised by a host computer and the CM 3a, performing control of commands and data between the host computer and the CM 3a.

The CM 3a, at least comprising a microprocessor 10a, a cache memory 11a and a RAM (random access memory) 12a, makes the microprocessor 10a operate according to a prescribed program, thereby accomplishing the update information storage unit 6, reference value generation unit 7, write method determination unit 8 and write unit 9.

The update information storage unit 6 detects an update place where the pre-update data stored by the cache memory 11a is updated by update data which is sent over from the host computer 14 by way of the CA 13a, and generates the update information management table 5 for managing the aforementioned update place per block to store it in the RAM 12a.

Then, the reference value generation unit 7 obtains an update place of update data from the update information management table 5 and calculates reference values (i.e., the first and second reference values) indicating a load borne by a writeback processing based on the update place. And the write method determination unit 8 determines a write method based on the aforementioned reference value.

The write unit 9 carries out the processing of writing (i.e., a write back processing), in the disk apparatus group 16a, the post-update data stored by the cache memory 11a according to the determined write method.

The disk apparatus group 16a is a RAID disk drive constituted by magnetic disks that are the disks #0 through #3.

Here, the disk apparatus group 16a according to the present embodiment is configured as RAID 5, but the number of magnetic disks constituting the disk apparatus group 16a is not limited as such, and rather a RAID disk drive constituted by at least three or a greater numbers of magnetic disks may be used.

Since the respective configurations of the above described CA 13a, CM 3a, router 15a and disk apparatus group 16a are the same as the CA 13b, CM 3b, router 15b and disk apparatus group 16b, respectively, and therefore the descriptions are omitted here.

The CM 3a and CM 3b are connected to each other by way of the router 17, and when update data is sent from the host computer 14 to the CM 3a by way of the CA 13a for example, the microprocessor 10a stores the update data in the cache memory 11a and at the same time transmits it to the CM 3b by way of the router 17. Then CM 3b stores the update data received by the microprocessor 10b in the cache memory 11b, thereby constantly storing the same data in the cache memory 11a within the CM 3a and the cache memory 11b within the CM 3b.

The above described processing makes the CM 3a and CM 3b dualized. Accordingly, the following description of the operation (i.e., processing) is of the CA 13a, CM 3a, router 15a and disk apparatus group 16a for simplicity.

Figure 5:
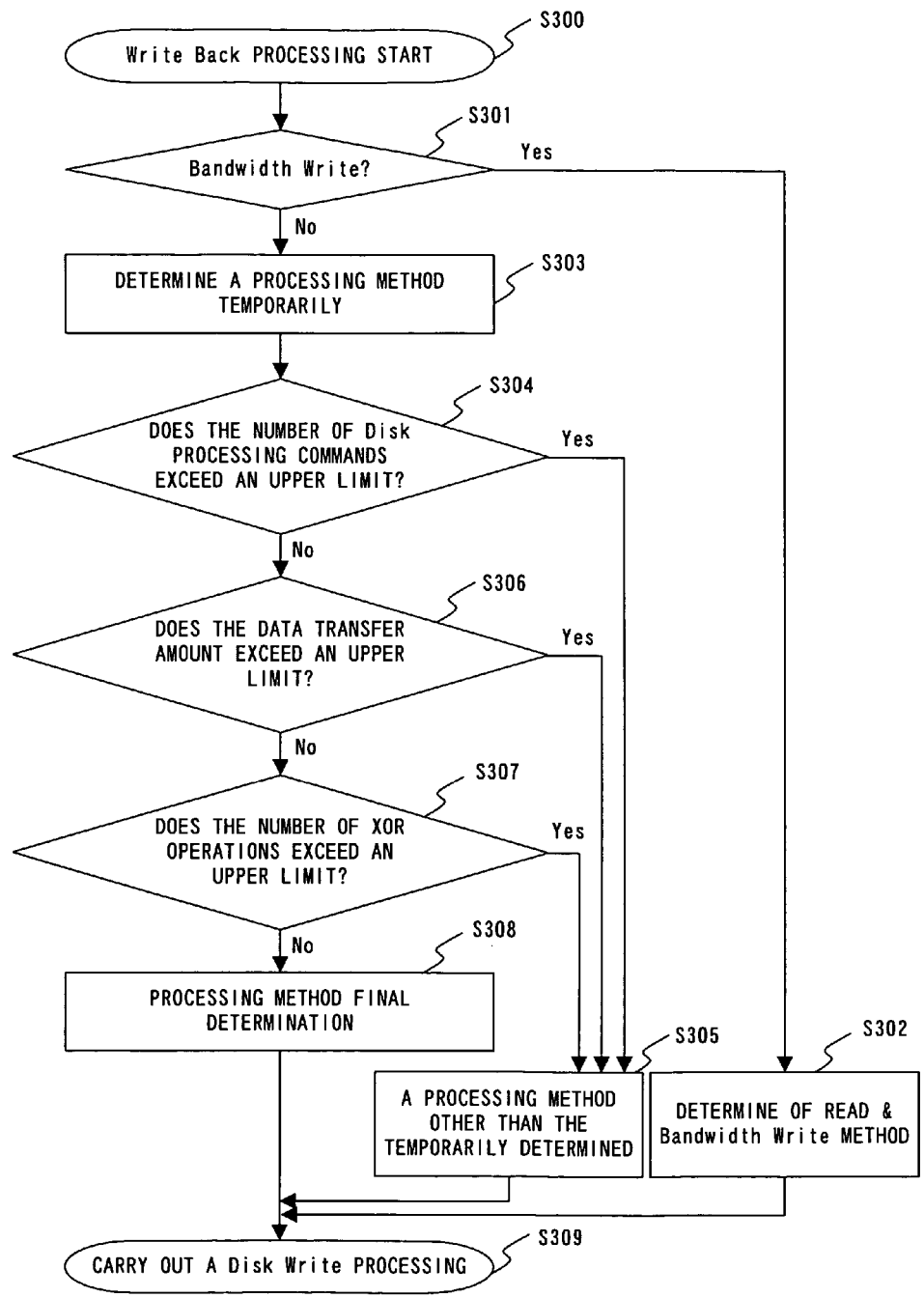
FIG. 5 is a flow chart showing a summary of processing by a RAID control apparatus according to the present embodiment.

FIG. 5 is a flow chart showing a summary of processing by the RAID control apparatus according to the present embodiment.

The write back processing shown by FIG. 5 is not carried out in the state of no request for a write back processing from a cache memory control unit, etcetera, for controlling the cache memory 11a.

On the other hand, the update information storage unit 6 comprised by the CM 3a, i.e., the RAID control apparatus 3, detects anupdatedplace, intheunitofblocks, whereapre-update data stored by the cache memory 11a is updated and generates the update information management table 5, followed by storing the generated update information management table 5 in a predetermined address in the RAM 12a.

Here, FIG. 6 exemplifies an update information management table 5 generated by the update information storage unit 6.

The update information management table 5 shown by FIG. 6 comprises numbers for update data (i.e., update data numbers) sent over from the host computer 14, numbers for data stripes (i.e., data stripe numbers) constituting update data by each-update data number, numbers for blocks (block numbers) constituting a data stripe by each data stripe number and a block update flag indicating a presence or absence of updating a block by each block number.

And a block update flag shown by FIG. 6 is constituted by one-bit data for example, with "1" indicating a presence of an update, while "0" indicating an absence of one, and is therefore stored in the RAM 12a as a bit map table.

As a cache memory control unit (not shown herein), et cetera, comprised by the CM 3a requests the microprocessor 10a for a write back processing, the CM 3a starts the write back processing (step S300), transferring the process to the step S301.

In the step S301, the CM 3a refers to the update information management table 5 stored by the cache memory 11a, and determines whether or not all the block update flags are "1" (i. e., a presence of an update).

If all the block update flags are "1", the post-update data stored by the cache memory 11a indicate that they have all been updated by update data sent over from the host computer 14, hence transferring the process to the step S302. Then a write method is set up with the Read & Bandwidth Write method.

Conversely, if not all the block update flags are "1" (meaning, at least one, or more, block update flags is "0") indicating that a part of the pre-update data stored by the cache memory 11a has been updated by update data which is sent over from the host computer 14, the process proceeds to the step S303 accordingly.

In the step S303, the CM 3a sets a write method to either one of the Small Write method or Read & Bandwidth Write method. Note that the present embodiment sets it to the Small Write method, although either one of the Small Write method or Read & Bandwidth Write method may be set in the actual S303.

Then the CM 3a reads (a) the number of commands issued to the disk apparatus group 16a, (b) a data transfer amount between the CM 3a and disk apparatus group 16a, and (c) the number of XOR processes executed to generate an update parity (simply called "total reference value" hereinafter) which are stored in a predefined address of the RAM 12a.

Here, the total reference value is an integrated value of (a) the number of commands issued to the disk apparatus group 16a, (b) a data transfer amount between the CM 3a and disk apparatus group 16a, and (c) the number of XOR processes for generating an update parity by a write back processing which is carried out in a predetermined period.

Therefore, the CM 3a counts (a) the number of commands issued to the disk apparatus group 16a, (b) a data transfer amount between the CM 3a and disk apparatus group 16a, and (c) the number of XOR processes for generating an update parity, respectively, at the time of a write back processing and stores a value by adding to the respective total reference value of the (a) and (c) in the RAM 12a.

On completing a process method temporary determination processing, the CM 3a transfers the process to the step S304.

In the step S304, the CM 3a checks whether or not (a) the number of commands issued, which is obtained in the step S303, exceeds an upper limit specified in advance. And, if the number of commands issued exceeds the upper limit, the process proceeds to the step S305 and a method other than the temporarily determined method of the step S303 is determined as a write method.

For instance, if the step S303 has selected the Small Write method and the number of commands issued has exceeded the upper limit, the step S305 changes the write method to the Read & Bandwidth Write method.

Meanwhile, if the number of commands issued does not exceed the upper limit in the step S304, the process proceeds to the step S306.

In the step S306, the CM 3a checks whether or not (b) a data transfer amount, which is obtained in the step S303, exceeds an upper limit specified in advance. And, if the data transfer amount exceeds the upper limit, the process proceeds to the step S305 and a method other than the temporarily determined method of the step S303 is determined as a write method.

For instance, if the step S303 has selected the Small Write method and then the transfer amount exceeds the upper limit, the ensuing step S305 changes the write method to the Read & Bandwidth Write method.

Conversely, if the data transfer amount does not exceed the upper limit in the step S306, the process proceeds to the step S307.

In the step S307, the CM 3a checks whether or not (c) the number of XOR processes, which is obtained in the step S303, exceeds an upper limit. And, if the number of XOR processes exceeds the upper limit, the process proceeds to the step S305 and a method other than the temporarily determined method in the step S303 is determined as a write method.

On the other hand, if the number of XOR processes does not exceed the upper limit in the step S307, the process proceeds to the step S308.

In the step S308, the CM 3a obtains update information (i.e., an update place) by referring to the update information management table 5 stored by the RAM 12a, and generates the first and second reference values. Then a write method is determined based on the comparison result of the first and second reference values. Note that the details of the step S308 will be described in reference to FIG. 7.

As the write method is determined by the processing of the steps S302, S305 and S308, the CM 3a transfers the process to the step S309 and carries out a write back processing by the determined write method.

In the processings described above, the step S303 sets up with the Small Write method as a write method, but it is of course possible to set up with the Read & Bandwidth Write method.

FIG. 7 is a flow chart showing a processing method final determination processing according to the present embodiment.

In the step S307 shown by FIG. 5, if (c) the number of XOR operations does not exceed an upper limit, the process proceeds to the step S500 to start a processing method final determination processing.

In the step S501, the CM 3a obtains update information (i.e., an update place) by referring to the update information management table 5 in the RAM 12a, followed by generating the first and second reference values based on the update information as described in the following.

The first description deals with the first reference value according to the present embodiment, that is:

(1a) the number of commands issued to the disk apparatus group 16a, (2a) a data transfer amount between the RAID control apparatus 3 and disk apparatus group 16a, and (3a) the number of XOR processes for generating an update parity, at the time of a write back processing by the Small Write method, followed by the description of the second reference value according to the present embodiment, that is:

(1b) the number of commands issued to the disk apparatus group 16a, (2b) a data transfer amount between the RAID control apparatus 3 and disk apparatus group 16a, and (3b) the number of XOR processes for generating an update parity, at the time of a write back processing by the Read & Bandwidth Write method.

Note that the actual examples of the (1a) through (3a), and the (1b) through (3b), will be described later by referring to FIGS. 8 and 10, and FIGS. 9 and 11, respectively.

(1a) The number of Commands Issued to the Disk Apparatus Group 16a

Figure 8:
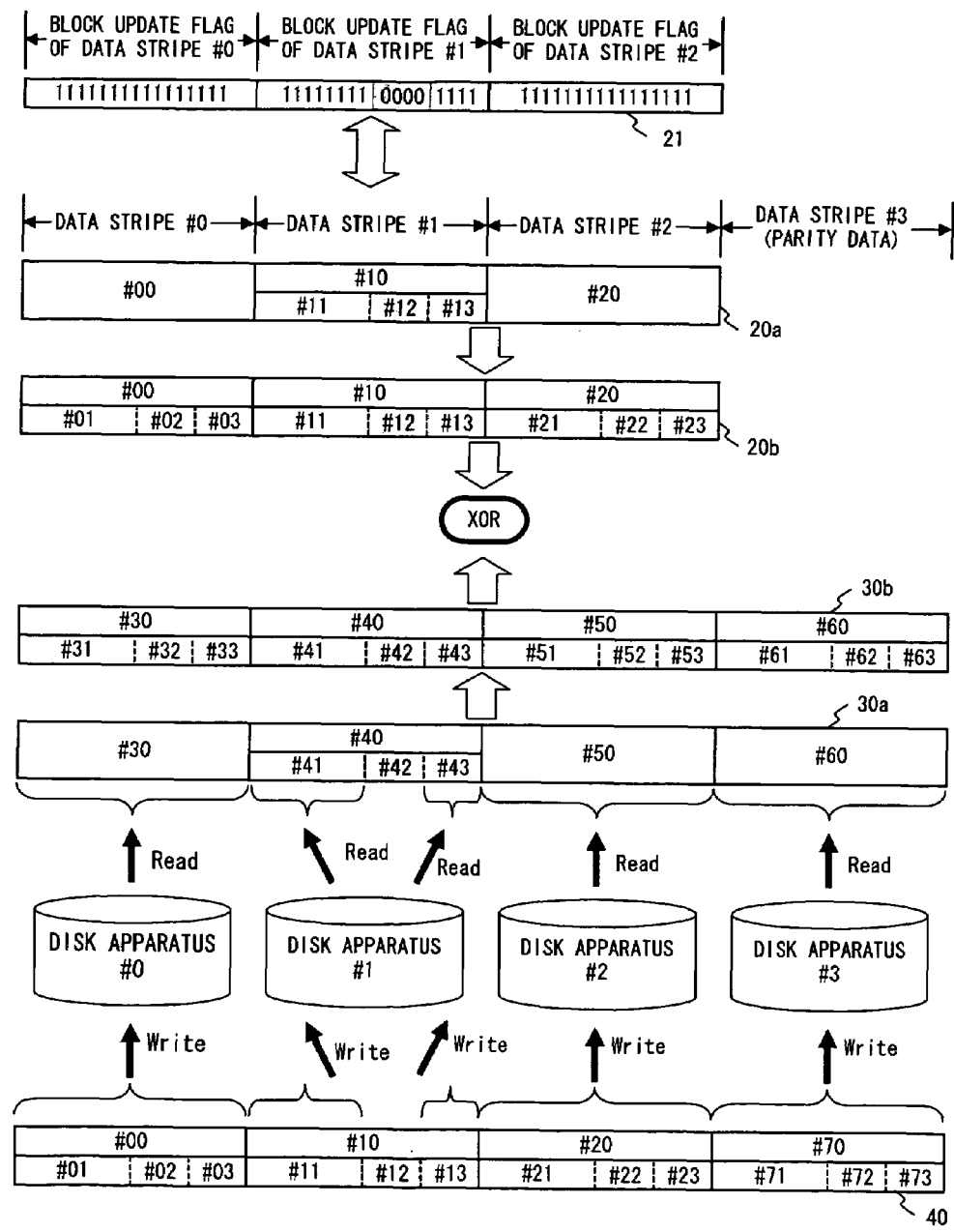
FIG. 8 describes a write back processing by using a Small Write method in a first example according to the present embodiment.

The CM 3a divides each data stripe into an area updated by update data (e.g., the areas #00, #11, #13 and #20 of the post-update data 20a shown by FIG. 8) and area un-updated (e.g., the area #12 of the post-update data 20a shown by FIG. 8) both of which are based on the update information obtained from the update information management table 5.

In the case of a write back processing by the Small Write method, the CM 3a reads the pre-update data and pre-update parity of the area updated by the update data from the disk apparatus group 16a. In this event, the number of Read instructions issued from the CM 3a to the disk apparatus group 16a is calculable by the following expression:

[The number of Read instructions]=(the number of updated areas)+1    (1)

Likewise, the CM 3a writes the post-update data and post-update parity of the area updated by the update data in the disk apparatus group 16a. In this event, the number of Write instructions issued from the CM 3a to the disk apparatus group 16a is calculable by the following expression:

[The number of Write instructions]=(the number of updated areas)+1    (2)

(2a) A Data Transfer Amount Between the RAID Control Apparatus 3 and Disk Apparatus Group 16a In the case of a write back processing by the Small Write method, the CM 3a reads the pre-update data and pre-update parity of the area updated by the update data out of the disk apparatus group 16a and writes the post-update data and post-update parity in the area updated by the update data in the disk apparatus group 16a.

Therefore, the data transfer amount in this event is calculable by the following expression:

[Data transfer amount at Read]=(the number of data stripes)×(the number of blocks in one data stripe)−(the number of blocks in the un-updated area)    (3)

[Data transfer amount at Write]=(the number of data stripes)×(the number of blocks in one data stripe)−(the number of blocks in the un-updated area)    (4)

(3a) The Number of XOR Processes for Generating an Update Parity

In the case of a write back processing by the Small Write method, the CM 3a further divides data stripes, which have been divided into the area updated by the update data and area un-updated (e.g., the post-update data 20a shown by FIG. 8), so that the areas within each data stripe have the same structure (e.g., the areas #01 through #03, #11 through #13, and #21 through #23 of the post-update data 20b shown by FIG. 8).

The CM 3a also reads the pre-update data out of the disk apparatus group 16a and divides it so that the areas within each data stripe have the same structure (e.g., the areas #31 through #33, #41 through #43, #51 through #53, and #61 through #63 of the pre-update data 30b shown by FIG. 8).

Then the CM 3a carries out XOR processings for the post-update data, pre-update data corresponding to the post-update data and the pre-updated parity of each area.

Therefore, the number of XOR processings in this event is calculated by:

[The number of XOR processings]=2×(the number of updated areas)+(the number of areas in one data stripe)    (5)

(1b) The Number of Commands Issued to the Disk Apparatus Group 16a

In the case of a writeback processing by the Read & Bandwidth Write method, the CM 3a reads the pre-update data of the area un-updated by the update data from the disk apparatus group 16a. In this event, the number of Read instructions issued from the CM 3a to the disk apparatus group 16a is calculable by the following expression:

[The number of Read instructions]=(the number of un-updated areas)    (6)

Then, as with the case of a write back processing by the Small Write method, the CM 3a writes the post-update data and post-update parity of the area which is updated by the update data to the disk apparatus group 16a. In this event, the number of Write instructions issued from the CM 3a to the disk apparatus group 16a is calculable by the above described expression (2).

(2b) A Data Transfer Amount Between the RAID Control Apparatus 3 and Disk Apparatus Group 16a In the case of a write back processing by the Read & Bandwidth Write method, the CM 3a reads only the pre-update data of the area un-updated by the update data out of the disk apparatus group 16a, and writes the post-update data and post-update parity of the area which is updated by the update data in the disk apparatus group 16a.

Therefore, the data transfer amount in this event is calculable by the following expressions:

[A data transfer amount at Read]=(the number of blocks of un-updated areas)    (7)

[A data transfer amount at Write]=(the number of data stripes)×(the number of blocks in one data stripe)−(the number of blocks in un-updated areas)    (8)

(3b) The Number of XOR Processings for Generating an Update Parity

Figure 9:
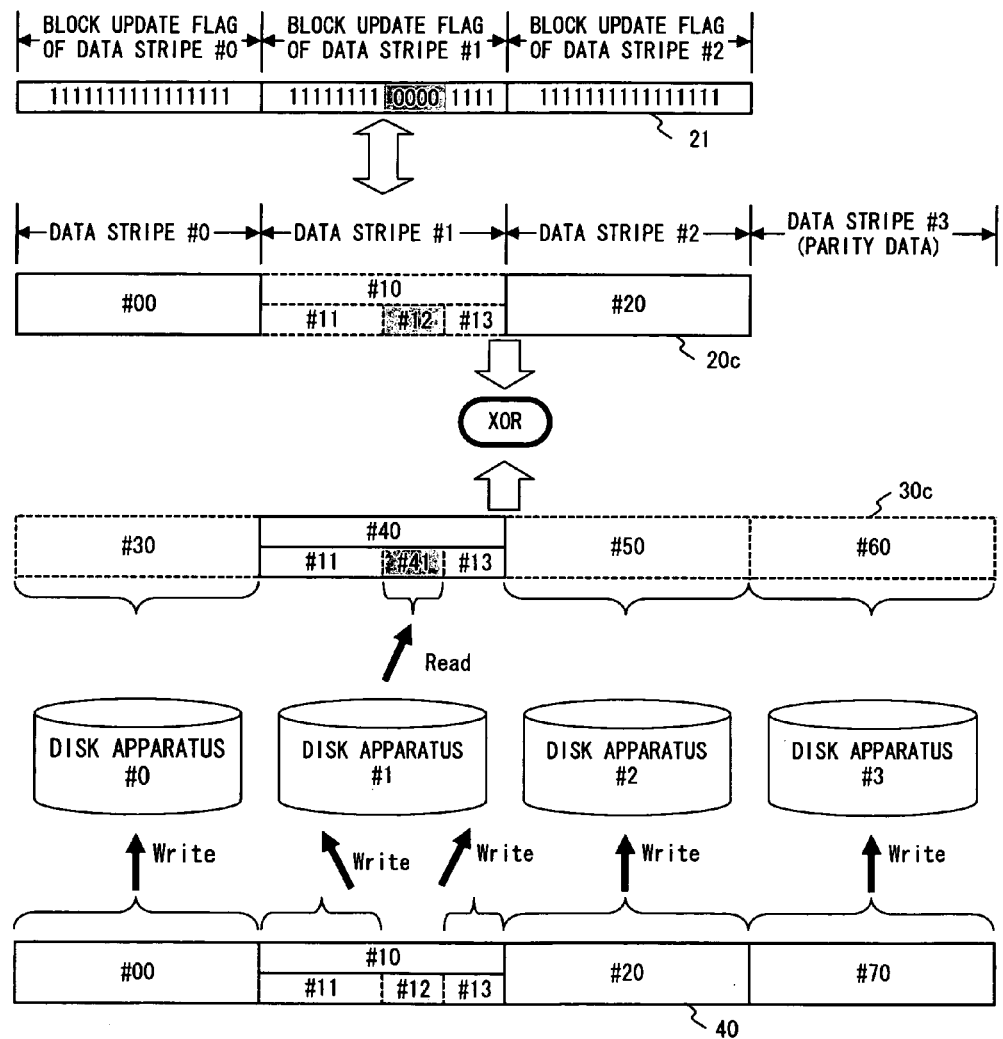
FIG. 9 describes a write back processing by using a Read & Bandwidth Write method in the first example according to the present embodiment.

The number of XOR processings in the case of a write back processing by the Read & Bandwidth Write method is calculated by the following, since the XOR processings are carried out for both the data stripes with all blocks being updated (e.g., the data stripes #0 and #2 of the post-update data 20c shown by FIG. 9) and data stripes including an un-updated area (e.g., the data stripe #1 of the pre-update data 30c shown by FIG. 9):

[The number of XOR processings]=(the number of disks constituting the disk apparatus group 16a)−1    (9)

As described above, having generated the first and second reference values in the step S501, the CM 3a transfers the process to the step S502.

In the step S502, the CM 3a compares (1) the first reference value with the second reference value for the number of commands issued and adds a point to the one with the smaller number of command issuances.

In the step S503, the CM 3a compares (2) the first reference value with the second reference value for the data transfer amount and adds a point to the one with the lowest data transfer amount.

Furthermore, in the step S504, the CM 3a compares (3) the first reference value with the second reference value for the number of XOR operations for generating an update parity and adds a point to the one with the smaller number of XOR operations.

Having finished the comparison processings in the steps S501 through S504, the CM 3a advances the process to the step S505.

In the step S505, the CM 3a compares the number of points for the first reference value with that of the second reference value, both of which are obtained in the steps S502 through S504. And, as a result of comparison, if the number of points for the first reference value is larger, the CM 3a transfers the process to the step S506 and sets up the write method as the Small Write method.

On the other hand, if the number of points for the second reference value is larger, the CM 3a transfers the process to the step S507 and sets up the write method as the Read & Bandwidth Write method.

Having determined the write method in the step S506 or S507, the CM 3a advances the process to the step S508 and ends the processing method final determination processing.

The following descriptions are of concrete examples of (1) the number of commands issued to the disk apparatus group 16; (2) a data transfer volume between the CM 3a and the disk apparatus group 16; and (3) the number of XOR processes for generating an update parity, at the time of a write back processing based on FIGS. 8 through 11.

And FIGS. 8 and 9 show the case of un-updated data existing in a part of data stripes as a first example. The FIG. 8 describes a write back processing by the Small Write method, and FIG. 9 describes a write back processing by the Read & Bandwidth Write method.

Figure 10:
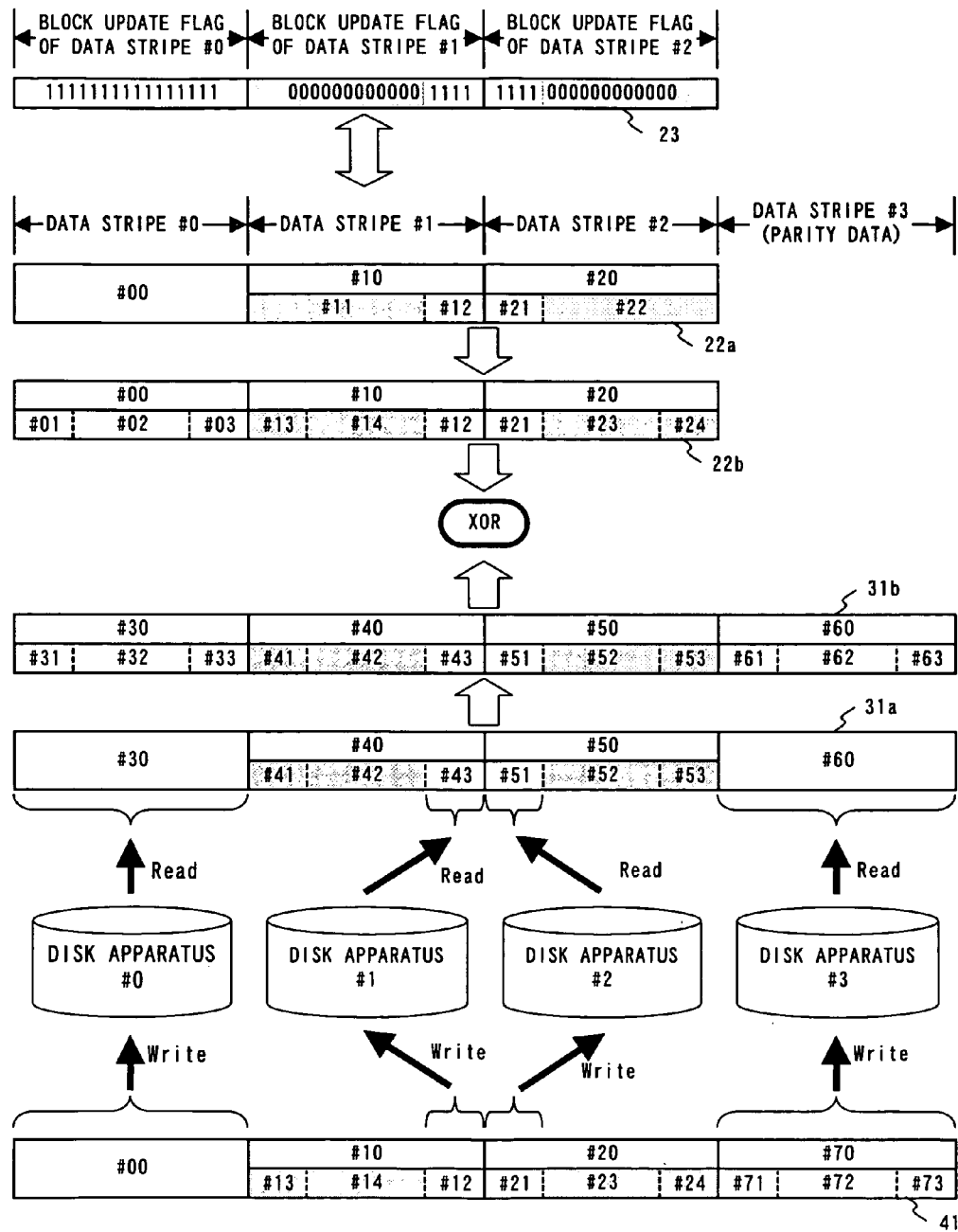
FIG. 10 describes a write back processing by using a Small Write method in a second example according to the present embodiment.
Figure 11:
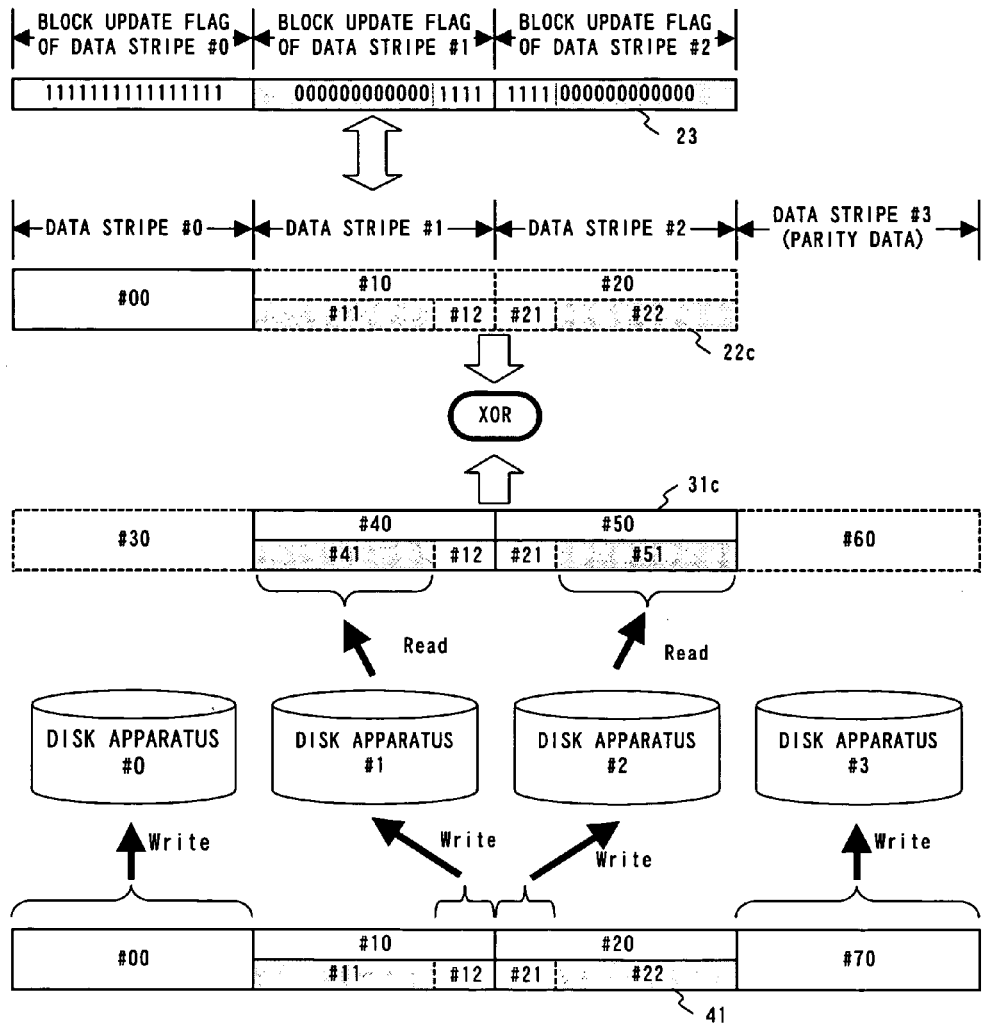
FIG. 11 describes a write back processing by using a Read & Bandwidth Write method in the second example according to the present embodiment.

And FIGS. 10 and 11 show the case of un-updated data existing in two parts of data stripes as a second example. The FIG. 10 describes a write back processing by the Small Write method, and FIG. 11 describes a write back processing by the Read & Bandwidth Write method.

Note that the description deals with the case of one data stripe being 16 blocks for simplicity of description, but there is of course no intention to limiting it as such.

FIG. 8 describes a write back processing by using a Small Write method in the case of un-updated data existing in a part of data stripes.

The post-update data 20a shown by FIG. 8 is data in the cache memory 11a striped to the data stripes #0 through #2. And the post-update data 20a shows the state of the data areas #00, #11, #13 and #20 being updated by update data.

Here, the areas #11, #12 and #13 shown for the post-update data 20a indicate that the area #10 is divided into the three areas #11, #12 and #13. The following areas, #01, #02 and #03, and the areas #21, #22 and #23, are the same.

In this event, the block update flags corresponding to the areas #00, #11, #13 and #20 of the post-update data 20a are "1", while that corresponding to the area #12 is "0" in the update information management table 21.

In a write back processing by the Small Write method, the CM 3a generates a post-update data 20b by dividing the post-update data 20a into an appropriate areas so that areas within each data stripe have the same structure and at the same time generates a pre-update data 30b by dividing the pre-update data 30a, which is read out of the disk apparatus group 16a constituted by the disk apparatuses #0 through #3, into appropriate areas so that the areas within each data stripe have the same structure.

And the CM 3a stores post-update data 40, which is added by update parities (#71 through #73) obtained by applying an XOR processing with regard to each area of the post-update data 20b and pre-update data 30b, in the disk apparatus group 16a.

(1a) The Number of Commands Issued to The Disk Apparatus Group 16a

In a write back processing by the Small Write method, the CM 3a issues a Read instruction to the disk apparatus group 16a, followed by generating pre-update data 30a by reading pre-update data corresponding to the post-update data 20a from the disk apparatus group 16a.

In this event, the CM 3a requests the disk apparatus #0 for the pre-update data of the area #00 and stores in the area #10 of the pre-update data 30a. And the CM 3a requests the disk apparatus #1 for the pre-update data in the areas #11 and #13 and stores in the areas #41 and #43, respectively. Likewise the CM 3a requests the disk apparatuses #2 and #3 for pre-update data of the areas #20 and #30 and therefore issues a total of five Read instructions to the disk apparatus group 16a.

And the CM 3a issues a Write instruction to the disk apparatus group 16a in order to write post-update data 40 added by an update parity which is generated from the post-update data 20b and pre-update data 30b.

In this event, the CM 3a requests the disk apparatus #0 for writing the data of the area #00 of the post-update data 40. And the CM 3a requests the disk #1 for writing the data of the areas #11 and #13, respectively. Likewise the CM 3a requests the disk apparatuses #2 and #3 for writing the data of the areas #20 and #71 through #73, and therefore issues a total of five Write instructions to the disk apparatus group 16a.

(2a) A Data Transfer Amount Between the CM 3a and Disk Apparatus group 16a

In a write back processing by the Small Write method, the CM 3a reads the pre-update data of the areas #00 (16 blocks), #11 (8 blocks), #13 (4 blocks) and #20 (16 blocks) and pre-update parity (16 blocks) of the post-update data 20a from the disk apparatus group 16a, and stores it in the areas #30, #41, #43, #50 and #60 of the pre-update data 30a in order to generate an update parity, thus resulting in the reading of a total of sixty (60) blocks of the from the disk apparatus group 16a.

And the CM 3a transfers the post-update data of the areas #00 (16 blocks), #11 (8 blocks), #13 (4 blocks) and #20 (16 blocks), and the post-update parity data (16 blocks in the areas #71 through #73) of the post-update data 40 to the disk apparatus group 16a in order to write the post-update data and update parity to the disk apparatus group 16a, thus resulting in writing a total of sixty (60) blocks of data thereto.

(3a) The Number of XOR Processings for Generating an Update Parity

In a write back processing by the Small Write method, the CM 3a generates post-update data 20b by area-dividing the post-update data 20a so that the areas within each data stripe have the same structure, and generates post-update data 30b by area-dividing the pre-update data 30a so that the areas within each data stripe have the same structure in order to carry out an XOR processing for generating an update parity.

Then generates an update parity by carrying out XOR processings as shown in the following:

[#71]=(#01) XOR (#11) XOR (#21) XOR (#31) XOR (#41) XOR (#51) XOR (#61)

[#72]=(#02) XOR (#22) XOR (#32) XOR (#52) XOR (#62)

[#73]=(#03) XOR (#13) XOR (#23) XOR (#33) XOR (#43) XOR (#53) XOR (#63)

Here, (#area number) indicates data within the applicable area. For example, (#30) indicates data in the area #30.

Therefore, there are six operations for calculating the (#71), four operations for calculating the (#72) and six operations for calculating the (#73), thus a total of sixteen (16) XOR operations.

FIG. 9 describes a write back processing by using a Read & Bandwidth Write method in the case of un-updated data existing in a part of data stripes.

Post-update data 20c shown by FIG. 9 is the post-update data 20a shown by FIG. 8 (or the post-update data 20b), indicating data striped by data stripes #0 through #2. Therefore, the post-update data 20c indicates the state of the data areas #00, #11, #13 and #20 being updated by update data.

In this event, the block update flags corresponding to the areas #00, #11, #13 and #20 of the post-update data 20c are "1", while those corresponding to the area #12 are "0" in the update information management table 21.

In the case of a write back processing by the Read & Bandwidth Write method, the CM 3a stores post-update data 40 added by an update parity (#70) obtained by carrying out an XOR processing for each data stripe of the post-update data 20c, pre-update data 30c read out of the disk apparatus group 16a constituted by the disk apparatuses #0 through #3 in the disk apparatus group 16a.

(1b) The Number of Commands Issued to the Disk Apparatus Group 16a

In the case of a write back processing by the Read & Bandwidth Write method, the CM 3a issues a Read instruction to the disk apparatus group 16a in order to read pre-update data which is not a target of updating from the disk apparatus group 16a. And the CM 3a generates pre-update data 30c by reading pre-update data corresponding to the post-update data 20c from the disk apparatus group 16a.

In this event, the CM 3a requests the disk apparatus #1 for the pre-update data of the area #12 of the post-update data 20c and stores it in the area #41 of the pre-update data 30c, resulting in issuing one Read instruction to the disk apparatus group 16a.

And the CM 3a issues a Write instruction to the disk apparatus group 16a in order to write, in the disk apparatus group 16a, the post-update data 40 added by an update parity which is generated from the post-update data 20c and pre-update data 30c.

In this event, the CM 3a requests the disk apparatus #0 for writing the data of the area #00 of the post-update data 40 and requests the disk apparatus #1 for writing the data of the areas #11 and #13 as in the case of the Small Write method. Likewise the CM 3a requests the disk apparatuses #2 and #3 for writing the data of the areas #20 and #70, respectively, of the post-update data 40, hence resulting in the issuing of a total of five Write instructions to the disk apparatus group 16a.

(2b) A Data Transfer Amount Between the CM 3a and Disk Apparatus Group 16a

In the case of a write back processing by the Read & Bandwidth Write method, the CM 3a reads the pre-update data of the area #12 of the post-update data 20c from the disk apparatus #1, hence resulting in reading four blocks of data out of the disk apparatus group 16a.

And the CM 3a transfers the post-update data of the areas #00, #11, #13 and #20 of the post-update data 40 and a post-update parity data of the area #70 to the disk apparatus group 16a in order to write post-update data and an update parity to the disk apparatus group 16a, hence resulting in writing a total of sixty (60) blocks of data thereto.

(3b) The Number of XOR Processings for Generating an Update Parity

In a write back processing by the Read & Bandwidth Write method, the CM 3a calculates the following expression in order to generate an update parity:

[#70]=(#00) XOR (#20) XOR (#40)

Therefore, two XOR operations are performed for calculating the (#70).

FIG. 10 describes a write back processing by using a Small Write method in the case of un-updated data existing in two places of data stripes.

Post-update data 22a shown by FIG. 10 is data stored by the cache memory 11a striped in data stripes #0 through #2. And the post-update data 22a indicates the state of the data areas #00, #12 and #21 being updated by update data.

In this event, a block update flag corresponding to the areas #00, #12 and #21 of the post-update data 22a is "1", while that corresponding to the areas #11 and #22 is "0", in the update information management table 23.

In a write back processing by the Small Write method, the CM 3a generates post-update data 22b by dividing the post-update data 22a into appropriate areas so that the areas within each data stripe have the same structure, and at the same time generates pre-update data 31b by dividing the pre-update data 31a, which is read from the disk apparatus group 16a constituted by the disk apparatuses #0 through #3, into appropriate areas so that the areas within each data stripe have the same structure.

And the CM 3a stores post-update data 41 attached by update parities (#71 through #73) obtained by carrying out an XOR processing for each area of the post-update data 22b and pre-update data 31b.

(1a) The number of Commands Issued to the Disk Apparatus Group 16a

In a write back processing by the Small Write method, the CM 3a issues a Read instruction to the disk apparatus group 16a; and generates pre-update data 31a by reading the pre-update data corresponding to the post-update data 22a from the disk apparatus group 16a.

In this event, the CM 3a requests the pre-update data of the area #00 of the disk apparatus #0 and stores it in the area #30 of the pre-update data 31a. And the CM 3a requests the pre-update data of the area #12 of the disk apparatus #1 and stores it in the area #43. Likewise the CM 3a requests the pre-update data of the area #21 of the disk apparatus #2 and stores it in the area #51, and requests the pre-update parity of the disk apparatus #3 and stores it in the area #60. Therefore, the CM 3a issues a total of four Read instructions to the disk apparatus group 16a.

And the CM 3a issues a Write instruction to the disk apparatus group 16a in order to write post-update data 40 added by an update parity, which is generated by the post-update data 20b and pre-update data 30b, in the disk apparatus group 16a.

In this event, the CM 3a requests that the data of the area #00 of the post-update data 41 is written to the disk apparatus #0; and requests that the data of the area #12 is written to the disk apparatus #1. Likewise, the CM 3a requests the data of the areas #21 and #70 are written to the disk apparatuses #2 and #3, respectively, hence issuing a total of four Write instructions to the disk apparatus group 16a.

(2a) A Data Transfer Amount Between the CM 3a and Disk Apparatus Group 16a

In a write back processing by the Small Write method, the CM 3a reads the pre-update data of the areas #00 (16 blocks), #12 (4 blocks), and #21 (4 blocks) of the post-update data 22a and a pre-update parity (16 blocks) from the disk apparatus group 16a, and stores it in the areas #30, #43, #51 and #60 of the pre-update data 31a in order to generate an update parity, hence resulting in reading a total of forty (40) blocks of data from the disk apparatus group 16a.

And the CM 3a transfers the post-update data of the areas #00 (16 blocks), #12 (4 blocks) and #21 (4 blocks) of the post-update data 41 and the post-update parity data (16 blocks of the area #70) to the disk apparatus group 16a in order to write the post-update data and update parity to the disk apparatus group 16a, hence resulting in writing a total of forty (40) blocks of data thereto.

(3a) The Number of XOR Processings for Generating an Update Parity

In a write back processing by the Small Write method, the CM 3a generates post-update data 22b by area-dividing the post-update data 22a so that the areas within each data stripe have the same structure in order to perform the XOR processing for generating an update parity, and likewise generates post-update data 31b by area-dividing the pre-update data 31a so that the areas within each data stripe have the same structure.

Then the CM 3a generates the update parity by carrying out XOR processings as shown in the following:

[#71]=(#01) XOR (#21) XOR (#31) XOR (#51) XOR (#61)

[#72]=(#02) XOR (#32) XOR (#62)

[#73]=(#03) XOR (#12) XOR (#33) XOR (#43) XOR (#63)

Therefore, there are four operations for calculating the [#71], two operations for calculating the [#72] and four operations for calculating [#73], thus a total of ten (10) XOR operations.

FIG. 11 describes a write back processing by using a Read & Bandwidth Write method in the case of un-updated data existing in two places of a data stripe.

Post-update data 22c shown by FIG. 11 is the post-update data 22a (or the post-update data 22b) shown by FIG. 10, indicating the data striped in data stripes #0 through #2. Therefore, the post-update data 22c indicates the state of the data areas #00, #12 and #21 being updated by update data.

In this event, the block update flags corresponding to the areas #00, #12 and #21 of the post-update data 22c are "1", while those corresponding to the areas #11 and #22 are "0" in the update information management table 23.

In a write back processing by the Read & Bandwidth Write method, the CM 3a stores post-update data 41 added by an update parity (#70), which is obtained by carrying out an XOR processing of the post-update data 22c and pre-update data 31c which is read from the disk apparatus group 16a constituted by the disk apparatuses #0 through #3 for each data stripe, in the disk apparatus group 16a.

(1b) The number of commands issued to the disk apparatus group 16a

In a write back processing by the Read & Bandwidth Write method, the CM 3a issues a Read instruction to the disk apparatus group 16a in order to read pre-update data for data that is not an update target therefrom, followed by generating pre-update data 31c by reading the pre-update data corresponding to the post-update data 22c out of the disk apparatus group 16a.

In this event, the CM 3a requests the pre-update data of the area #11 of the post-update data 22c of the disk apparatus #1 and stores it in the area #41 of the pre-update data 31c. And the CM 3a requests the pre-update data of the area #22 of the disk apparatus #2 and stores it in the area #51. Therefore the CM 3a issues a total of two Read instructions to the disk apparatus group 16a.

And the CM 3a issues a Write instruction to the disk apparatus group 16a in order to write the post-update data 40 added by an update parity, which is generated from the post-update data 20c and pre-update data 30c, in the disk apparatus group 16a.

In this event, the CM 3a requests the disk apparatus #0 for writing the data of the area #00 of the post-update data 41 and requests the disk apparatus #1 for writing the data of the area #12 in the same way as the Small Write method. Likewise the CM 3a requests the disk apparatus #2 for writing the data of the area #21 of the post-update data 41 and requests the disk apparatus #3 for writing the data of the area #70, hence resulting in issuing a total of four Write instructions to the disk apparatus group 16a.

(2b) A Data Transfer Amount between the CM 3a and Disk Apparatus Group 16a

In a write back processing by the Read & Bandwidth Write method, the CM 3a reads the respective pre-update data of the area #11 of the post-update data 22c from the disk apparatus #1 and the pre-update data of the area #22 from the disk apparatus #2, hence resulting in reading eight (8) blocks of data (4 blocks plus 4 blocks) from the disk apparatus group 16a.

And the CM 3a transfers the post-update data of the areas #00, #12 and #21 of the post-update data 41 and the post-update parity of the area #70 to the disk apparatus group 16a in order to write the post-update data and update parity to the disk apparatus group 16a, hence resulting in writing a total of 40 blocks of data thereto.

(3b) The Number of XOR Processings for Generating an Update Parity

In a write back processing by the Read & Bandwidth Write method, a calculation is carried out in order to generate an update parity, as follows:

[#70]=(#00) XOR (#40) XOR (#50)

Therefore, two XOR operations are carried out in order to determine the [#70].

As described above, the RAID control apparatus according to the present embodiment generates the first and second reference values, compares the two and carries out a write back processing by using a write method with the lower of the reference values, thereby making it possible to reduce a load at the time of a write back processing and improve the performance of a RAID apparatus (e.g., an access speed and access time of a disk apparatus group).

And a use of (1) the number of commands issued to the disk apparatus group 16a, (2) a data transfer amount between the RAID control apparatus 3 and disk apparatus group 16a, and (3) the number of XOR processings for generating an update parity, at the time of a write back processing as the first and second reference values; and a selection of a write method where the integration of the above described (1) through (3), as shown by FIG. 7, becomes low provide the benefit of making it possible to reduce a cause for a bottleneck against a performance improvement of the RAID apparatus.

Furthermore, a setup of an upper limit for an integrated value of the (a) the number of commands issued to the disk apparatus group 16a, (b) a data transfer amount between the CM 3a and disk apparatus group 16a, and (c) the number of XOR processings for generating an update parity, for a write back processing carried out in a predefined period of time; and a selection of a write method so as not to exceed the upper limit, as shown by the steps S304 through S307 shown by FIG. 5, also provide the benefit of making it possible to reduce a cause for a bottleneck against a performance improvement of the RAID apparatus.

What is claimed is:

1. A write back method for making a RAID (i.e., redundant array of independent/inexpensive disk drives) apparatus carry out:
    an update information storing processing for storing update information of post-update data stored by a cache memory, which has been updated by update data sent from a host computer, in an update information management table;
    a reference value generation processing, by obtaining the update information of the post-update data from the update information management table, for generating a first reference value expressing a load of a write processing by using a Small Write method, based on the aforementioned update information, and a second reference value expressing a load of a write processing by using a Read & Bandwidth Write method;
    a write method determination processing, by comparing the first reference value with the second reference value generated by the aforementioned reference value generation processing, for determining a write method out of either the Small Write method or the Read & Bandwidth Write method, based on the comparison result; and
    a write processing for reading the data stripe of the post-update data which is stored by the cache memory, and updating the data stripe by using a method determined by the write method determination processing.

2. The write back method according to claim 1, using at least either one from the number of command issuance being issued to said disk apparatus, a data transfer volume exchanged between said disk apparatuses or the number of XOR operations required for generating parity data for post-update data for said first and second reference values.

3. The write back method according to claim 1, wherein said write method determination processing determines the Small Write method if said first reference value is smaller than said second reference value, while the Read & Bandwidth Write method if the second reference value is smaller than the first reference value.

4. The write back method according to claim 1, wherein said write method determination processing compares the number of commands issued to said disk apparatus, a data transfer volume exchanged between said disk apparatuses and the number of XOR operations required for generating parity data for post-update data, using all of them as said first and second reference values; and, as a result of the comparison, determines the Small Write method if the first reference value is smaller than the second reference value with regard to at least two out of the number of commands issued, the data transfer volume and the number of XOR operations, while the Read & Bandwidth Write method if the second reference value is smaller than the first reference value.

5. The write back method according to claim 1, wherein said write method determination processing sets upper limits for the number of commands issued to said disk apparatus, a data transfer volume exchanged between said disk apparatuses and the number of XOR operations required for generating parity data for post-update data, respectively, and when the upper limit is exceeded determines one of a Small Write method or a Read & Bandwidth Write method which does not exceed the upper limit.

6. A RAID control apparatus, comprising:
    an update information storage unit for storing update information of post-update data stored by a cache memory, which has been updated by update data sent from a host computer, in an update information management table;
    a reference value generation unit, by obtaining the update information of the post-update data from the update information management table, for generating a first reference value expressing a load of a write processing by using a Small Write method, based on the aforementioned update information, and a second reference value expressing a load of a write processing by using a Read & Bandwidth Write method;
    a write method determination unit, by comparing the first reference value with the second reference value generated by the reference value generation unit, for determining a write method out of either the Small Write method or the Read & Bandwidth Write method, based on the comparison result; and
    a write unit for reading the data stripe of the post-update data which is stored by the cache memory, and updating the data stripe by using a method determined by the write method determination unit.

7. The RAID control apparatus according to claim 6, using at least either one from the number of commands issued to said disk apparatus, a data transfer volume exchanged between said disk apparatuses or the number of XOR operations required for generating parity data for post-update data for said first and second reference values.

8. The RAID control apparatus according to claim 6, wherein said write method determination unit determines the Small Write method if said first reference value is smaller than said second reference value, while the Read & Bandwidth Write method if the second reference value is smaller than the first reference value.

9. The RAID control apparatus according to claim 6, wherein said write method determination unit compares the number of commands issued to said disk apparatus, a data transfer volume exchanged between said disk apparatuses and the number of XOR operations required for generating parity data for post-update data, using all of them as said first and second reference values; and, as a result of the comparison, determines a Small Write method if the first reference value is smaller than the second reference value with regard to at least two out of the number of command issuance, the data transfer volume and the number of XOR operations, while a Read & Bandwidth Write method if the second reference value is smaller than the first reference value.

10. The RAID control apparatus according to claim 6, wherein
said write method determination unit sets upper limits for the number of commands issued to said disk apparatus, a data transfer volume exchanged between said disk apparatuses and the number of XOR operations required for generating parity data for post-update data, respectively, and when the upper limit is exceeded determines one of a Small Write method or a Read & Bandwidth Write method which does not exceed the upper limit.

11. A RAID apparatus equipping itself with a plurality of storage units for storing update data sent from a host computer, comprising:
an update information storage unit for storing update information of post-update data stored by a cache memory, which has been updated by update data, in an update information management table;
a reference value generation unit, by obtaining the update information of the post-update data from the update information management table, for generating a first reference value expressing a load of a write processing by using a Small Write method, based on the aforementioned update information, and a second reference value expressing a load of a write processing by using a Read & Bandwidth Write method;
a write method determination unit, by comparing the first reference value with the second reference value generated by the reference value generation unit, for determining a write method of either the Small Write method or the Read & Bandwidth Write method, based on the comparison result; and
a write unit for reading the data stripe of the post-update data which is stored by the cache memory, and storing the data stripe by using a method determined by the write method determination unit in the plurality of storage units.

12. The RAID apparatus according to claim 11, using
at least either one from the number of commands issued to said disk apparatus, a data transfer volume exchanged between said disk apparatuses or the number of XOR operations required for generating parity data for post-update data for said first and second reference values.

13. The RAID apparatus according to claim 11, wherein
said write method determination unit determines a Small Write method if said first reference value is smaller than said second reference value, while a Read & Bandwidth Write method if the second reference value is smaller than the first reference value.

14. The RAID apparatus according to claim 11, wherein
said write method determination unit compares the number of commands issued to said storage units, a data transfer volume exchanged with the storage units and the number of XOR operations required for generating parity data for post-update data, using all of them as said first and second reference values; and, as a result of the comparison, determines a Small Write method if the first reference value is smaller than the second reference value with regard to at least two of the number of commands issued, the data transfer volume and the number of XOR operations, while a Read & Bandwidth Write method if the second reference value is smaller than the first reference value.

15. The RAID apparatus according to claim 11, wherein said write method determination unit sets upper limits for the number of commands issued to said storage units, a data transfer volume exchanged with the storage unit and the number of XOR operations required for generating parity data for post-update data, respectively, and when the upper limit is exceeded determines one of a Small Write method or a Read & Bandwidth Write method which does not exceed the upper limit.

* * * * *

UNITED STATES PATENT AND TRADEMARK OFFICE
CERTIFICATE OF CORRECTION

| | | |
|---|---|---|
| PATENT NO. | : 7,370,145 B2 | Page 1 of 1 |
| APPLICATION NO. | : 11/356287 | |
| DATED | : May 6, 2008 | |
| INVENTOR(S) | : Kazuhiko Ikeuchi et al. | |

It is certified that error appears in the above-identified patent and that said Letters Patent is hereby corrected as shown below:

Title Page, Column 2, under References Cited, skip one space below and insert --FOREIGN PATENT DOCUMENTS

| | | |
|---|---|---|
| JP | 07-311659 | 11/1995 |
| JP | 2003-296038 | 10/2003--. |

Signed and Sealed this

Seventh Day of October, 2008

JON W. DUDAS
*Director of the United States Patent and Trademark Office*